United States Patent
Gao

(10) Patent No.: US 10,282,626 B2
(45) Date of Patent: May 7, 2019

(54) IDENTITY RECOGNITION DEVICE AND METHOD FOR MANUFACTURING THE SAME, AND IDENTITY RECOGNITION METHOD

(71) Applicant: BOE TECHNOLOGY GROUP CO., LTD., Beijing (CN)

(72) Inventor: Jian Gao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/325,735

(22) PCT Filed: Mar. 11, 2016

(86) PCT No.: PCT/CN2016/076121
§ 371 (c)(1),
(2) Date: Jan. 12, 2017

(87) PCT Pub. No.: WO2017/036115
PCT Pub. Date: Mar. 9, 2017

(65) Prior Publication Data
US 2018/0165534 A1    Jun. 14, 2018

(30) Foreign Application Priority Data
Sep. 1, 2015 (CN) .......................... 2015 1 0555838

(51) Int. Cl.
*G06K 9/00* (2006.01)
*G06F 21/32* (2013.01)
*G06K 9/62* (2006.01)

(52) U.S. Cl.
CPC ......... *G06K 9/00892* (2013.01); *G06F 21/32* (2013.01); *G06K 9/6267* (2013.01)

(58) Field of Classification Search
CPC .................. G06T 7/0012; G06T 15/50; G06T 2207/30196; G06K 9/001; G06K 9/00892
See application file for complete search history.

(56) References Cited

U.S. PATENT DOCUMENTS

| 6,766,764 B1* | 7/2004 | Chrisey ................. C23C 14/048 118/726 |
| 2003/0029913 A1* | 2/2003 | Tsukamoto ........ G06K 9/00006 235/382 |

(Continued)

FOREIGN PATENT DOCUMENTS

| CN | 102106734 A | 6/2011 |
| CN | 104055521 A | 9/2014 |

(Continued)

OTHER PUBLICATIONS

First Office Action for Chinese Application No. 201510555838.1, dated Mar. 13, 2017, 7 Pages.

(Continued)

*Primary Examiner* — Euengnan Yeh
(74) *Attorney, Agent, or Firm* — Brooks Kushman P.C.

(57) ABSTRACT

An identity recognition device and a method for manufacturing the same, and an identity recognition method are provided. The identity recognition device includes a display panel including a backlight source, a foot type and dermatoglyph recognition layer, located at a light-outputting side of the display panel and configured to detect a light-shielding condition of a light-outputting surface and acquire sole outline information and sole dermatoglyph information of a target user standing with bare foot, a pressure sensing detection layer, located at a non-light-outputting side of the display panel or between the display panel and the foot type and dermatoglyph recognition layer and configured to acquire sole pressure information of the target user, and an identity recognition module, configured to recognize an (Continued)

identity of the target user based on the sole outline information, the sole dermatoglyph information and the sole pressure information.

17 Claims, 6 Drawing Sheets

(56) References Cited

U.S. PATENT DOCUMENTS

| | | | |
|---|---|---|---|
| 2005/0097762 A1* | 5/2005 | Biesbrouck | A61B 5/1036 33/3 R |
| 2006/0005041 A1* | 1/2006 | Lazeroms | A61B 5/1171 713/186 |
| 2012/0330494 A1* | 12/2012 | Hendrix | B60L 11/1838 701/29.3 |
| 2017/0061224 A1* | 3/2017 | Moliner | G06K 9/00892 |

FOREIGN PATENT DOCUMENTS

| | | | |
|---|---|---|---|
| CN | 104535155 A | 4/2015 | |
| CN | 104535156 A | 4/2015 | |
| CN | 105224845 A | 1/2016 | |

OTHER PUBLICATIONS

International Search Report and Written Opinion for Application No. PCT/CN2016/076121, dated May 27, 2016, 13 Pages.
Second Office Action for Chinese Application No. 201510555838.1, dated Aug. 1, 2017, 8 Pages.

* cited by examiner

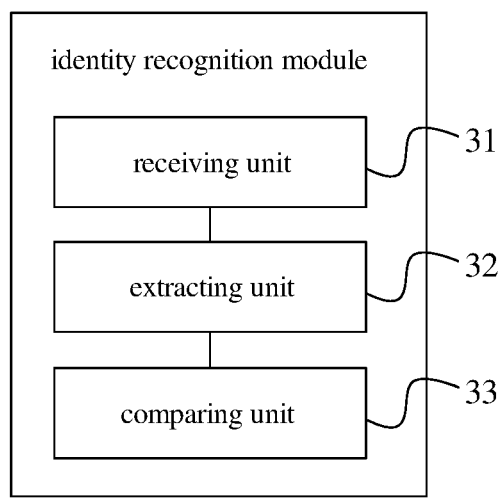
FIG. 5
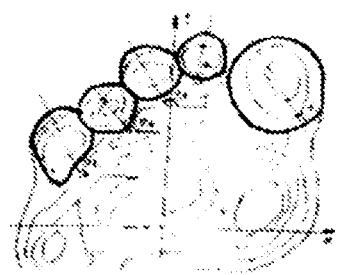
FIG. 6
  
FIG. 7A　　　FIG. 7B　　　FIG. 7C

IDENTITY RECOGNITION DEVICE AND METHOD FOR MANUFACTURING THE SAME, AND IDENTITY RECOGNITION METHOD

CROSS-REFERENCE TO RELATED APPLICATIONS

This application is the U.S. national phase of PCT Application No. PCT/CN2016/076121 filed on Mar. 11, 2016, which claims priority to Chinese Patent Application No. 201510555838.1 filed on Sep. 1, 2015, the disclosures of which are incorporated in their entirety by reference herein.

TECHNICAL FIELD

The present disclosure relates to the field of identity recognition, and in particular to an identity recognition device and a method for manufacturing the same, and an identity recognition method.

BACKGROUND

With the rapid development of biological information technology, unique biometric feature information of each human-being, such as, fingerprint feature information, face feature information, iris feature information, voice feature information and vein feature information, is widely used for personal identity recognition. Fingerprint recognition technology and face recognition technology are most widely used currently.

Specific requirements for identity authentication are proposed in certain application fields, such as, sports competition, security, financial institutions, and different biometric features have different spheres of application; thus, multiple biometric features may be used together during performing identity authentication. Multimodal biometric recognition technology based on multiple biological features is a new tendency, and in some cases, may have better performance than a singlemodal biological recognition technology.

However, for achieving multimodal biometric recognition, different acquisition devices are required for different biometric features. For example, an existing dual authentication system based on face recognition and fingerprint recognition requires higher cost and longer sampling time. In addition, the application may be complex and the efficiency may be low since multiple sets of recognition devices and acquisition devices are used in multimodal biometric recognition.

SUMMARY

In view of the defects in the related technology, the present disclosure provides an identity recognition device and a method for manufacturing the same, and an identity recognition method, for achieving compact multimodal biometric recognition.

In one aspect, the present disclosure provides an identity recognition device, which includes:

a display panel including a backlight source;

a foot type and dermatoglyph recognition layer, that is located at a light-outputting side of the display panel and configured to detect a light-shielding condition of a light-outputting surface of the identity recognition device to acquire sole outline information and soledermatoglyph information of a target user standing with bare foot;

a pressure sensing detection layer, that is located at a non-light-outputting side of the display panel or between the display panel and the foot type and dermatoglyph recognition layer and configured to acquire sole pressure information of the target user standing with bare foot; and an identity recognition module, configured to recognize an identity of the target user based on the sole outline information, the sole dermatoglyph information and the sole pressure information.

Optionally, the identity recognition module may include:

a receiving unit, connected to the foot type and dermatoglyph recognition layer and the pressure sensing detection layer and configured to receive the sole outline information, the sole dermatoglyph information and the sole pressure information;

an extracting unit, connected to the receiving unit and configured to extract at least one item of sole feature of the target user according to the sole outline information, the sole dermatoglyph information and the sole pressure information from the receiving unit; and a comparing unit, connected to the extracting unit and configured to compare the at least one item of sole feature with at least one corresponding item of sole feature of each authenticated user pre-stored in an identity authentication feature library and determine whether the identity of the target user matches an identity of any authenticated user.

Optionally, the identity recognition module may further include:

a warning unit, connected to the comparing unit and configured to send a warning prompt when the comparing unit determines that the identity of the target user does not match the identity of any authenticated user.

Optionally, the identity recognition module may further include:

an obtaining unit, connected to the receiving unit and configured to obtain weight information of the target user based on the sole pressure information from the receiving unit.

Optionally, the identity recognition module may further include:

an adding unit, connected to the extracting unit and the comparing unit, and configured to add the at least one item of sole feature from the extracting unit and a newly generated user identification into the identity authentication feature library when the comparing unit determines that the identity of the target user does not match the identity of any authenticated user.

Optionally, the identity authentication feature library may be stored in a cloud server.

Optionally, the identity recognition device may further include a storage connected to the identity recognition module, where the identity authentication feature library is stored in the storage.

Optionally, the storage is further connected to the display panel such that contents stored in the storage are readable via the display panel and/or contents are writable into the storage via the display panel.

Optionally, the foot type and dermatoglyph recognition layer may include multiple rows of scanning lines and multiple columns of data lines, multiple photosensitive units are defined by intersections of the multiple rows of scanning lines and the multiple columns of data lines forms, and each of the multiple photosensitive units includes:

a capacitor having a first end connected to a first bias voltage;

a first transistor, where a gate electrode of the first transistor is connected to a second bias voltage, one of a source electrode and a drain electrode of the first transistor is connected to a third bias voltage, and the other of the source electrode and the drain electrode of the first transistor is connected to a second end of the capacitor, where a light from the light-outputting surface of the display panel is received by an active region of the first transistor;

a second transistor, where a gate electrode of the second transistor is connected to one of the multiple rows of scanning lines, one of a source electrode and a source electrode of the second transistor is connected to the second end of the capacitor, and the other of the source electrode and the drain electrode of the second transistor is connected to one of the multiple columns of data lines.

Optionally, the pressure sensing detection layer may include pressure sensing patterns formed at least two positions, and a material of the pressure sensing patterns may include a piezoelectric material.

Optionally, the at least one item of sole feature may include one or any combination of:
an outline pattern of a toe region;
a relative position relationship among centers of toes;
an outline pattern of a forefoot region;
an outline pattern of a heel region;
a position of a highly-pressed point of a heel relative to the sole; and
a pattern of sole dermatoglyphs.

In another aspect, the present disclosure provides an identity recognition method, which includes:
acquiring sole outline information, sole dermatoglyph information and sole pressure information of a target user standing with bare foot;
extracting at least one item of sole feature of the target user according to the sole outline information, the sole dermatoglyph information and the sole pressure information; and
comparing the at least one item of sole feature with at least one corresponding item of sole feature of each authentication user pre-stored in an identity authentication feature library, to determine whether an identity of the target user matches an identity of any authenticated user.

Optionally, the identity recognition method may further include:
sending a warning prompt when it is determined that the identity of the target user does not match the identity of any authenticated user.

Optionally, the identity recognition method may further include:
obtaining weight information of the target user based on the sole pressure information.

Optionally, the identity recognition method may further include:
adding the at least one item of sole feature and a newly generated user identification into the identity authentication feature library when it is determined that the identity of the target user does not match the identity of any authenticated user.

Optionally, the identity authentication feature library may be stored in a cloud server.

Optionally, the at least one item of sole feature may include one or any combination of:
an outline pattern of a toe region;
a relative position relationship among centers of toes;
an outline pattern of a forefoot region;
an outline pattern of a heel region;
a position of a highly-pressed point of a heel relative to the sole; and
a pattern of sole dermatoglyphs.

In another aspect, the present disclosure provides a method for manufacturing an identity recognition device, which includes:
arranging a pressure sensing detection layer at a light-outputting side or a non-light-outputting side of a display panel including a backlight source, where the pressure sensing detection layer is configured to acquire sole pressure information of a target user standing with bare foot;
arranging a foot type and dermatoglyph recognition layer at the light-outputting side of the display panel, where the foot type and dermatoglyph recognition layer is configured to detect a light-shielding condition of a light-outputting surface, and acquire sole outline information and sole dermatoglyph information of the target user standing with bare foot; and
forming a connection between an identity recognition module and the pressure sensing detection layer, and forming a connection between the identity recognition module and the foot type and dermatoglyph recognition layer, where the identity recognition module is configured to recognize an identity of the target user based on the sole outline information, the sole dermatoglyph information and the sole pressure information.

From the technical solutions described above, all of the sole outline information, the sole dermatoglyph information and the sole pressure information are acquired such that various physiological features such as a sole bone structure, a skin appearance and a standing posture are authenticated together, thus a compact multimodal biometric recognition approach is achieved.

Further, compared with other biological features, the sole feature is preferable for recognizing the identity of the target user for following reasons:

1) sole dermatoglyphs of a human being are planar in a natural state, and can be acquired easily;

2) a featured area of the sole dermatoglyphs of the human being is larger, such that much more feature information may be extracted, and the sole dermatoglyphs may be acquired from a larger active region;

3) since the sole dermatoglyphs of the human being include abundant lines and dermatoglyph features and the active region is larger, features, based on which identity recognition or identity authentication may be performed, can still be extracted from incomplete dermatoglyphs or dermatoglyph information of low resolution and low quality;

4) the sole dermatoglyphs can be located using a baseline and a centre of gravity, which causing the sole dermatoglyphs to be rotationally invariant and unique;

5) low requirements may be set for the resolution of the pattern of the acquired sole dermatoglyphs, therefore, the acquisition of the sole dermatoglyphs is simpler than that of fingerprints and the cost is lower;

6) the sole of the human being has abundant features, and the foot type information, and the sole dermatoglyph information and the sole pressure information can be combined to obtain a multi-modal device or system having enhanced recognition performance; and 7) recognition of sole dermatoglyphs is hardly to be regarded as an act of infringement and is more acceptable to the user.

Moreover, with the identity recognition device in the present disclosure, the display function and the identity recognition function may be cooperated, for example, the result of the identity recognition may be displayed through the display panel, and the display panel can provide an interface for setting related parameters during the identity recognition. Furthermore, the identity recognition device in the present disclosure may be manufactured based on a structure of an existing display panel, and the cost is much more controllable. Accordingly, with the identity recognition device and the corresponding identity recognition method provided in the present disclosure, accuracy of identity recognition is improved, a structure of the identity recognition device is simplified, and the application cost is reduced. Obviously, it is not necessary for any product or method to achieve all advantages of the present disclosure.

BRIEF DESCRIPTION OF THE DRAWINGS

In order to explain the technical solutions in the embodiments of the present disclosure more clearly, accompany drawings used in these embodiments will be briefly introduced hereinafter. Apparently, the drawings described hereinafter are only for some embodiments of the present disclosure, and other drawings may be obtained by those skilled in the art based on those drawings without creative efforts.

FIG. 5 is a block diagram showing a structure of an identity recognition module according to some embodiments of the present disclosure;

FIG. 6 is a schematic diagram showing an outline pattern of a toe region according to some embodiments of the present disclosure;

FIG. 7A to FIG. 7F are schematic diagrams showing patterns of several kinds of toe regions according to some embodiments of the present disclosure;

DETAILED DESCRIPTION OF THE EMBODIMENTS

In order to make the technical solutions and the advantages of the present disclosure more apparent, the present disclosure will be described hereinafter in a clear and complete manner in conjunction with the drawings and embodiments. Obviously, embodiments disclosed in the following are merely a part of, rather than all of, the embodiments of the present disclosure. Based on the disclosed embodiments, the skilled in the art may obtain the other embodiments without paying creative efforts, which also fall within the scope of the present disclosure.

It should be noted that, in the present disclosure, sole outline information refers to graphic information of an outline of a sole surface, sole dermatoglyph information refers to graphic information of dermatoglyph of the sole, and sole pressure information refers to information about pressures generated at multiple positions of the sole.

Figure 1:
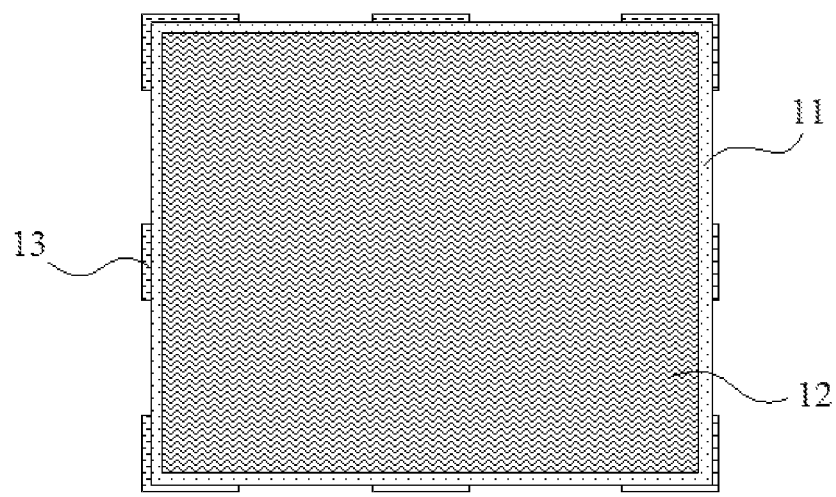
FIG. 1 is a top-view of a schematic structure of an identity recognition device according to some embodiments of the present disclosure.

FIG. 1 illustrates a top-view of a schematic structure of an identity recognition device according to some embodiments of the present disclosure. Referring to FIG. 1, the identity recognition device includes: a display panel 11, a foot type and dermatoglyph recognition layer 12 located at a light-outputting side (i.e., the side facing a reader in FIG. 1) of the display panel 11, and a pressure sensing detection layer 13 located at a non-light-outputting side (i.e., the side away from the reader in FIG. 1) of the display panel 11.

Figure 2:
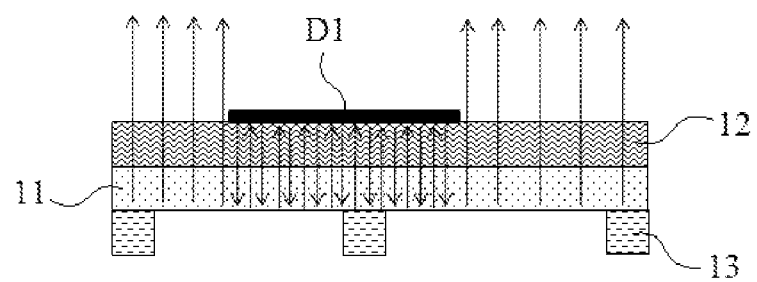
FIG. 2 illustrates a side-view and an operation principle of the identity recognition device shown in FIG. 1.

Specifically, references are made to FIG. 2, which illustrates a side-view of the structure and an operation principle of the identity recognition device shown in FIG. 1. The display panel 11 includes a backlight source (not shown in FIG. 2), and can emit light toward the light-outputting side, as shown in FIG. 2. With this structure, the foot type and dermatoglyph recognition layer 12 can detect a light-shielding condition of a light-outputting surface of the identity recognition device to acquire sole outline information and sole dermatoglyph information of a target user standing on the identity recognition device with bare foot. For example, a shelter D1 is positioned on the light-outputting surface of the identity recognition device, as shown in FIG. 2; within a region covered by the shelter D1, the light-outputting surface of the identity recognition device may generate a reflecting interface, and light transmitted through the foot type and dermatoglyph recognition layer 12 and emitted from the display panel 11 is reflected by the reflecting interface. Reflected light may transmit through the foot type and dermatoglyph recognition layer 12, and light sensing structures arranged in the foot type and dermatoglyph recognition layer 12 can obtain light intensities at different positions, and therefore, a light-shielding condition of the light-outputting surface is obtained. Thus, when the target user stands on the light-outputting surface of the identity recognition device with bare foot, the foot type and dermatoglyph recognition layer 12 can analyze the light-shielding condition of the light-outputting surface to obtain sole outline information and sole dermatoglyph information of the target user.

In another aspect, the pressure sensing detection layer 13 at the non-light-outputting side of the display panel 11 may include pressure sensing structures arranged at different positions, and the pressure sensor structures are configured to acquire sole pressure information of the standing target user. The identity recognition device may further include an identity recognition module (not shown in FIG. 1 and FIG. 2), which is configured to recognize the identity of the target user standing with bare foot based on the sole outline information, the sole dermatoglyph information and the sole pressure information.

It should be understood that, the identity recognition module may extract several items of sole features of the target user from the sole outline information, the sole dermatoglyph information and the sole pressure information in a preset manner, and compare the extracted sole features with pre-stored sole features to recognize the identity of the target user.

It should be understood that, the display panel 11 of the identity recognition device mainly functions to provide light for the sole, such that the foot type and dermatoglyph recognition layer 12 can detect the light-shading condition. In some embodiments, the display panel 11 may only include a light-emitting device and a controlling switch to achieve a bright/dark display function. In other embodiments, the display panel 11 may be a liquid crystal display (LCD), which is not limited herein.

It should be understood that, in order to obtain the light-shading condition of the light-outputting surface, the foot type and dermatoglyph recognition layer 12 may cover whole display region of the display panel 11, and the light-outputting surface is flat. The foot type and dermatoglyph recognition layer 12 may be transparent completely, or may include a non-transparent region that is not observable, provided that light can be transmitted through the foot type and dermatoglyph recognition layer 12. In another aspect, the pressure sensing detection layer 13 may be made of a non-transparent material, because the pressure sensing detection layer 13 is arranged at the non-light-outputting side of the display panel 11; and in order to obtain the sole pressure information with high accuracy, the display panel 11 and the foot type and dermatoglyph recognition layer 12 generally have relatively small elasticity moduli, i.e., the display panel 11 and the foot type and dermatoglyph recognition layer 12 are not easily deformable, such that they are substantially flat and may not generate deformation such as depression when using the identity recognition device.

Figure 3:
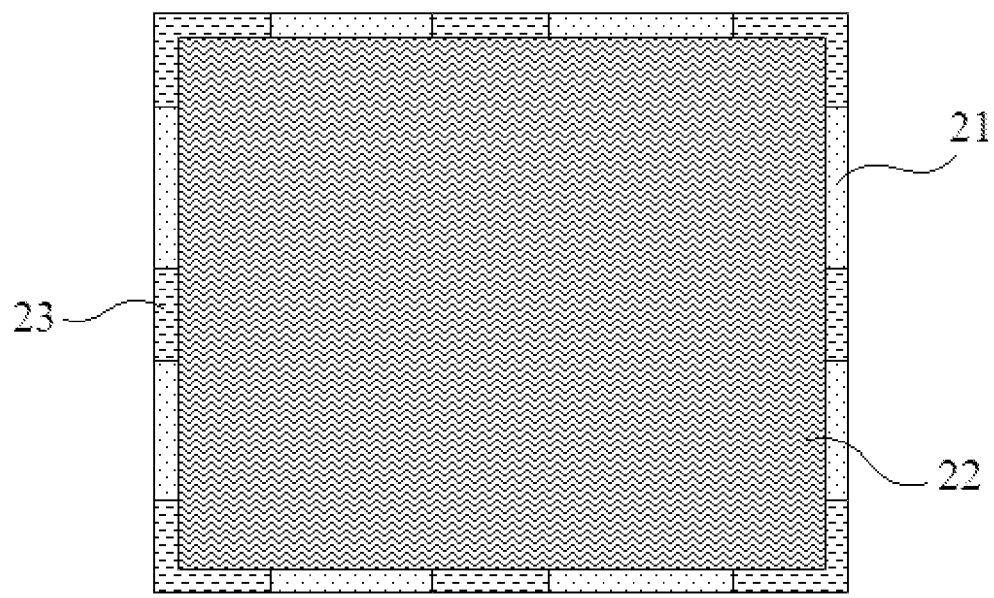
FIG. 3 is a top-view of a schematic structure of an identity recognition device according to some embodiments of the present disclosure.

FIG. 3 illustrates a top-view of a schematic structure of an identity recognition device according to some embodiments of the present disclosure. Referring to FIG. 3, the identity recognition device includes: a display panel 21, a foot type and dermatoglyph recognition layer 22 located at a light-outputting side (i.e., the side facing a reader in FIG. 3) of the display panel 21, and a pressure sensing detection layer 23 arranged between the display panel 21 and the foot type and dermatoglyph recognition layer 22.

Figure 4:
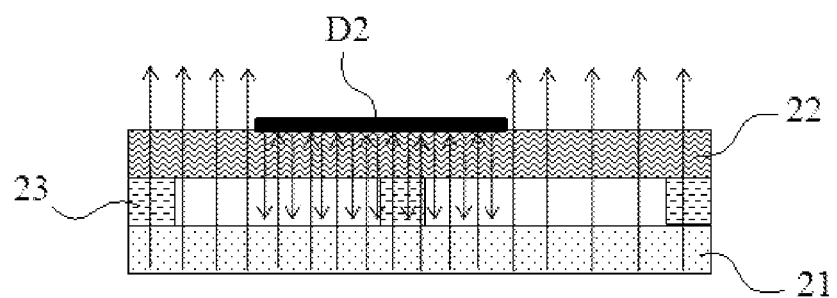
FIG. 4 illustrates a side-view and an operation principle of the identity recognition device shown in FIG. 3.

Specifically, references are made to FIG. 4, which illustrates a side-view of the structure and an operation principle of the identity recognition device shown in FIG. 3. The display panel 21 includes a backlight source (not shown in FIG. 4), and can emit light toward the light-outputting side, as shown in FIG. 4. With this structure, the foot type and dermatoglyph recognition layer 22 can detect a light-shielding condition of a light-outputting surface of the identity recognition device to acquire sole outline information and sole dermatoglyph information of a target user standing on the identity recognition device with bare foot. For example, a shelter D2 is positioned on the light-outputting surface of the identity recognition device, as shown in FIG. 4; within a region covered by the shelter D2, the light-outputting surface of the identity recognition device may generate a reflecting interface, and light transmitted through the pressure sensing detection layer 23 and the foot type and dermatoglyph recognition layer 22 and emitted from the display panel 21 is reflected by the reflecting interface. Reflected light may transmit through the foot type and dermatoglyph recognition layer 22, and light sensing structures arranged in the foot type and dermatoglyph recognition layer 22 can obtain light intensities at different positions, and therefore, a light-shielding condition of the light-outputting surface is obtained. Thus, when the target user stands on the light-outputting surface of the identity recognition device with bare foot, the foot type and dermatoglyph recognition layer 22 can analyze the light-shielding condition of the light-outputting surface to obtain sole outline information and sole dermatoglyph information of the target user.

In another aspect, the pressure sensing detection layer 23 between the display panel 21 and the foot type and dermatoglyph recognition layer 22 may include pressure sensing structures arranged at different positions, and the pressure sensor structures are configured to acquire sole pressure information of the standing target user. The identity recognition device may further include an identity recognition module (not shown in FIG. 3 and FIG. 4), which is configured to recognize the identity of the target user standing with bare foot based on the sole outline information, the sole dermatoglyph information and the sole pressure information.

It should be understood that, the identity recognition module may extract several items of sole features of the target user from the sole outline information, the sole dermatoglyph information and the sole pressure information in a preset manner, and compare the extracted sole features with pre-stored sole features to recognize the identity of the target user.

It should be understood that, the display panel 21 of the identity recognition device mainly functions to provide light for the sole, such that the foot type and dermatoglyph recognition layer 22 can detect the light-shading condition. In some embodiments, the display panel 21 may only include a light-emitting device and a controlling switch to achieve a bright/dark display function. In other embodiments, the display panel 21 may be a liquid crystal display (LCD), which is not limited herein. It should be understood that, a display function of the display panel and an identity recognition function of the identity recognition module can be integrated in the identity recognition device and can cooperate with each other. For example, a result of the identity recognition may be displayed on the display panel, and the display panel can provide an interface for setting related parameters during the identity recognition. Specifically, the identity recognition module and the display panel may be connected to a same storage, the identity recognition device can store a recognition result identification in the storage, the display panel can display an identity recognition result according to the recognition result identification in the storage, and an identity recognition parameter in the storage may be modified on an image displayed on the display panel so as to perform a user configuration.

It should be understood that, in order to obtain the light-shading condition of the light-outputting surface, the foot type and dermatoglyph recognition layer 22 may cover whole display region of the display panel 21, and the light-outputting surface is flat. The foot type and dermatoglyph recognition layer 22 may be transparent completely, or may include a non-transparent region that is not observable, provided that light can be transmitted through the foot type and dermatoglyph recognition layer 22. In another aspect, the pressure sensing detection layer 23 is generally made of a transparent material since it is arranged between the display panel 21 and the foot type and dermatoglyph recognition layer 22; and in order to obtain the sole pressure information with high accuracy, the pressure sensing detection layer 23 may have similar elasticity moduli at various positions, for example, the pressure sensing structures are surrounded by a transparent material having a similar elasticity modulus as the pressure sensing structures, so as to form a whole pressure sensing detection layer of uniform elasticity modulus. The foot type and dermatoglyph recognition layer 22 may generally have relatively small elasticity moduli, i.e., the foot type and dermatoglyph recognition layer 22 is not easily deformable, such that the foot type and dermatoglyph recognition layer 22 is substantially flat and may not generate deformation such as depression when using the identity recognition device.

To manufacture the identity recognition device described in FIG. 1 and FIG. 2, the structure of an existing display panel needs not to be modified, and the pressure sensing detection layer may be directly arranged at the non-light-outputting side of the display panel, thus the process is simple and the cost is low. To manufacture the identity recognition device described in FIG. 3 and FIG. 4, since the pressure sensing detection layer is integrated on a surface of the display panel, the identity recognition device may be thinner, and the appearance of the identity recognition device is aesthetic since it does not need to be packaged additionally.

Specifically, the pressure sensing detection layer described in any foregoing embodiment may include pressure sensing patterns formed at at least two positions, and the pressure sensing patterns are made of a piezoelectric material. Specifically, the piezoelectric material may be arranged in regions according to where the pressure sensing detection laye is located in FIG. 1 to FIG. 4, and the piezoelectric material in the regions form individual pressure sensing structures. A pressure sensing signal is obtained based on changes of electrical signals of an upper surface and a lower surface of each pressure sensing structure; hence, pressure sensing signals at different positions can be acquired, integrated and analyzed to obtain the sole pressure information.

As can be seen, for the identity recognition devices shown in FIGS. 1 and 2 and in FIGS. 3 and 4, the sole outline information, the sole dermatoglyph information and the sole pressure information are acquired such that various physiological features such as a sole bone structure, a skin appearance and a standing posture can be authenticated together, thus a compact multimodal biometric recognition approach is achieved.

FIG. 5 illustrates a block diagram showing a structure of an identity recognition module according to some embodiments of the present disclosure, with reference to which the structure of the identity recognition module in any of the above-described identity recognition devices can be understood. As shown in FIG. 5, the identity recognition module includes:

a receiving unit 31 connected to the foot type and dermatoglyph recognition layer and the pressure sensing detection layer, configured to receive the sole outline information, the sole dermatoglyph information and the sole pressure information;

an extracting unit 32 connected to the receiving unit 31, configured to extract at least one item of sole feature of the target user based on the sole outline information, the sole dermatoglyph information and the sole pressure information received from the receiving unit 31; and a comparing unit 33 connected to the extracting unit 32, configured to compare the at least one item of sole feature extracted by the extracting unit 32 with at least one corresponding item of sole feature of each authenticated user pre-stored in an identity authentication feature library and determine whether the identity of the target user matches an identity of any authenticated user.

In the case that multiple items of sole features are extracted, each item of the extracted sole features is compared with a corresponding sole feature of each authenticated user pre-stored in the identity authentication feature library, and it is determined that the identity of the target user matches an identity of an authenticated user when the comparing unit 33 determines that respective items of the extracted sole features are consistent with respective pre-stored items of sole features of the authenticated user.

The at least one item of sole feature may include any one or any combination of following features: an outline pattern of a toe region, a relative position relationship among centers of toes, an outline pattern of a forefoot region, an outline pattern of a heel region, a position of a highly-pressed point of a heel with respect to the sole, and a pattern of sole dermatoglyphs.

Figure 7D:
Figure 7E:
Figure 7F:

Specifically, a schematic diagram showing an outline pattern of a toe region according to some embodiments of the present disclosure is illustrated in FIG. 6. Based on the sole outline information, it is determined that the outline pattern of the toe region includes five closed patterns in FIG. 6. Any two adjacent closed patterns may be separated from each other by a certain distance or may be connected with each other. Therefore, this type of sole feature may include, for example, shape of one or more of the five closed patterns (such as, circle, oval, inverted triangle, regular triangle or irregular shape), size of one or more of the five closed patterns, ratios of sizes among the five closed patterns, or the like. Specifically, FIG. 7A to FIG. 7F are schematic diagrams showing several types of toe region shape according to some embodiments of the present disclosure. The toe region shape refers to a shape of a curve line, a straight line or a zigzag line surrounding the above five closed patterns. The five closed patterns are close to the curve line, the straight line or the zigzag line and are located at an identical side of the curve line, the straight line or the zigzag line. The toe region shapes in FIG. 7A to FIG. 7D are a polygon, a corniform, a slope and a dentate shape, respectively. The toe region shapes in FIG. 7E and FIG. 7F are irregular. Therefore, it is determined, based on the outline pattern of the toe region, whether the toe region shape of the target user is a polygon, a corniform, a slope and a dentate shape or irregular, and the determined toe region shape is compared with a shape of a toe region of each user stored in the identity authentication feature library to recognize the identity of the target user.

Figure 8:
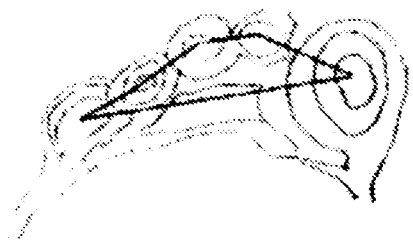
FIG. 8 is a schematic diagram showing a relative position relationship among centers of toes according to some embodiments of the present disclosure.

FIG. 8 is a schematic diagram showing a relative position relationship among centers of toes according to some embodiments of the present disclosure. The center of each toe refers to the center of dermatoglyphs of the toe. As shown in FIG. 8, the sole dermatoglyph information may be processed and the center of each toe may be located according to the dermatoglyphs of the toe. This type of sole feature may include a shape of a pattern formed by connecting of the centers of multiple toes, for example, a polygon, a corniform, a slope, or a step formed by connecting the centers of five toes.

Figure 9:
FIG. 9 is a schematic diagram showing a forefoot region according to some embodiments of the present disclosure.

FIG. 9 is a schematic diagram showing a forefoot region of the sole according to some embodiments of the present disclosure. As shown in FIG. 9, the sole outline information and the sole dermatoglyph information may be processed and the pattern of the forefoot region may be obtained by means of pattern analyzing and pattern dividing. This type of sole feature may include a shape of an outline pattern of the forefoot region, a position of the forefoot region with respect to the whole sole, an inclining direction of the forefoot region with respect to the whole sole, and the like. The above features are stable features reflecting specificity of the type of the forefoot, which are of significant meaning for recognizing the type of the forefoot.

Figure 10:
FIG. 10 is a schematic diagram showing a heel region according to some embodiments of the present disclosure.
Figure 11A:
FIG. 11A to FIG. 11D are schematic diagrams showing patterns of several kinds of dermatoglyphs of a ball of a sole according to some embodiments of the present disclosure.
Figure 11B:
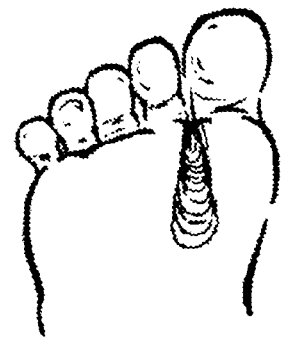
Figure 11C:
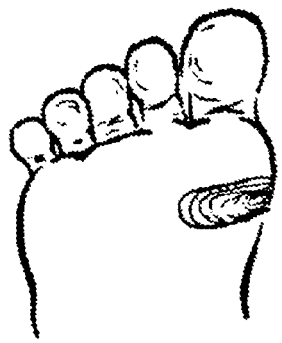
Figure 11D:

FIG. 10 is a schematic diagram showing a heel region of the sole according to some embodiments of the present disclosure. As shown in FIG. 10, the sole outline information and the sole dermatoglyph information may be processed and a pattern of the heel region may be obtained by means of pattern analyzing and pattern dividing. Other than a shape of an outline pattern of the heel region, a position of the heel region with respect to the whole sole, and an inclining direction of the heel region with respect to the whole sole, this type of sole feature may further include a shape of an outline of a highly-pressed surface of the heel, a relative position of a highly-pressed point, and the like, in further consideration of the sole pressure information. Under the same condition, the highly-pressed surface and the highly-pressed point are stabler than other regions or points of the heel.

FIG. 11A to FIG. 11D are schematic diagrams showing patterns of several types of dermatoglyphs of a ball of a foot according to some embodiments of the present disclosure. The patterns of the dermatoglyphs of the ball in FIG. 11A to FIG. 11D are whorl, ulnar loop, radial loop and arch respectively. It should be understood that, the type of the pattern of the dermatoglyphs of the ball may be obtained through processing the sole dermatoglyph information. Thus, it can be determined whether a pattern of a ball region of the target user is in shape of the whorl, the ulnar loop, the radial loop or the arch based on the pattern of the dermatoglyphs of the ball, and the determined pattern of the ball region is compared with a pattern of a ball region of each user pre-stored in the identity authentication feature library to recognize the identity of the target user.

Further, compared with other biological features, the sole feature is preferable for recognizing the identity of the target user for following reasons:

1) sole dermatoglyphs of a human being are planar in a natural state, and can be acquired easily;

2) a featured area of the sole dermatoglyphs of the human being is larger, such that much more feature information may be extracted, and the sole dermatoglyphs may be acquired from a larger active region;

3) since the sole dermatoglyphs of the human being include abundant lines and dermatoglyph features and the active region is larger, features, based on which identity recognition or identity authentication may be performed, can still be extracted from incomplete dermatoglyphs or dermatoglyph information of low resolution and low quality;

4) the sole dermatoglyphs can be located using a baseline and a centre of gravity, which causing the sole dermatoglyphs to be rotationally invariant and unique;

5) low requirements may be set for the resolution of the pattern of the acquired sole dermatoglyphs, therefore, the acquisition of the sole dermatoglyphs is simpler than that of fingerprints and the cost is lower;

6) the sole of the human being has abundant features, and the foot type information, and the sole dermatoglyph information and the sole pressure information can be combined to obtain a multi-modal device or system having enhanced recognition performance; and 7) recognition of sole dermatoglyphs is hardly to be regarded as an act of infringement and is more acceptable to the user.

Accordingly, with the identity recognition device including the identity recognition module based on any of the above mentioned sole features, accuracy of identity recognition is improved, a structure of the identity recognition device is simplified, and the application cost is reduced. For example, the identity recognition devices in the embodiments of the present disclose may be used to determined whether movement of a diving athlete is standard or not according to data change before and after jumping, thereby assisting in improving athletic ability.

Further, in addition to above described structures, the identity recognition module may include any one or any combination of a warning unit, an obtaining unit, and an adding unit that are not shown in the drawings.

The warning unit is connected to the comparing unit and configured to, in the case that the comparing unit determines that the identity of the target user does not match the identity of any authenticated user, send a warning prompt in following exemplary manners: sounding through a buzzer, displaying a warning image through a display panel, or sending a warning signal through a wireless communication module to a communication device carried by a guard, which is not limited here. In order to avoid a wrong warning, the identity recognition module may acquire sole outline information, sole dermatoglyph information and sole pressure information of the target user again and perform identity recognition again after sending the waning prompt, and may stop sending the warning prompt when a wrong warning is detected. In a situation for which special requirements of security and protection are proposed, e.g., in an indoor situation where personal privacy needs to be protected, the identity recognition device may be arranged at the entrance and exit of the target situation. The identity recognition device can recognize an identity of a person entering the target situation and warn when the person is determined as an unauthenticated person.

The obtaining unit is connected to the receiving unit 31, and is configured to obtain weight information of the target user based on the sole pressure information from the receiving unit 31. The accuracy of identity recognition is improved with the combination of the weight information and the sole pressure information. Some physiological parameters can be obtained through the weight information together with the sole pressure information, such that health management for individual person or for family can be achieved.

The adding unit is connected to the extracting unit 32 and the comparing unit 33, and is configured to add at least one item of sole feature from the extracting unit 32 and a newly generated user identification into the identity authentication feature library when the comparing unit 33 determines that the identity of the target user does not match any authenticated identity. Therefore, the identity recognition device in the embodiments of the present disclosure may be applied to a target environment (for example, a natatorium) for identity recognition or identity authenticating so as to perform management conveniently.

For the above-mentioned identity recognition module, the identity authentication feature library may be stored in a cloud server. Personal information data of all users may be together stored in the cloud server which is safely protected, such that the personal information is effectively protected from being revealed. In addition, since all data are stored together, the user can use the data anytime and anywhere, and cloud service can be provided by means of computation based on big data. Optionally, the identity authentication feature library may be stored in a storage connected to the identity recognition module as an identity recognition parameter, such that the identity recognition function can be localized. The storage may be connected to the display panel such that contents stored in the storage are readable via the display panel and/or contents are writable into the storage via the display panel; thus, the display function and the identity recognition function are cooperated.

Figure 12:
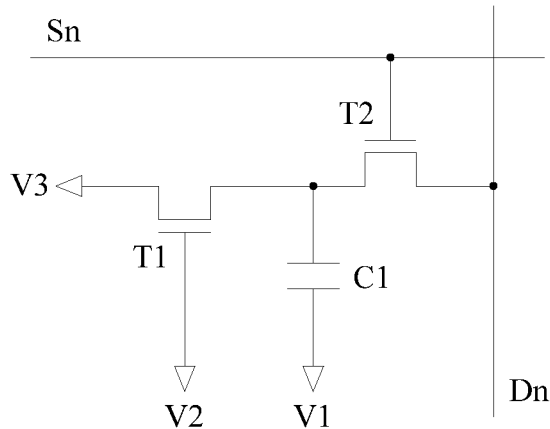
FIG. 12 is a schematic structural diagram of a circuit of a foot type and dermatoglyph recognition layer according to some embodiments of the present disclosure.

FIG. 12 is a schematic structural diagram of a circuit of a foot type and dermatoglyph recognition layer according to some embodiments of the present disclosure. FIG. 12 illustrates circuit structure of multiple photosensitive units of the foot type and dermatoglyph recognition layer, which are defined by intersections of multiple rows of scanning lines and multiple columns of data lines. As shown in FIG. 12, each photosensitive unit includes:

a capacitor C1 having a first end connected to a first bias voltage V1;

a first transistor T1 having an active region made of amorphous silicon and a gate electrode connected to a second bias voltage V2, where one of a source electrode and a drain electrode of the first transistor T1 is connected to a third bias voltage V3, and the other one of the source electrode and the drain electrode of the first transistor T1 is connected to a second end of the capacitor C1; and a second transistor T2 having an active region made of an oxide semiconductor and a gate electrode connected to one row of scanning line Sn, where one of a source electrode and a source electrode of the second transistor T2 is connected to the second end of the capacitor C1, and the other one of the source electrode and the drain electrode of the second transistor T2 is connected to one column of data line Dn.

For example, the first transistor T1 may be an N-channel or a P-channel amorphous silicon thin film transistor (a-Si TFT), and the second transistor T2 may be an N-channel or a P-channel bottom gate type oxide thin film transistor (Oxide TFT), such as IZO TFT or IGZO TFT. For the N-channel and P-channel thin film transistors, the connection manners of the source and drain electrodes are different, which can be arranged as required in actual application and the arrangement is well known by the skilled in the art, thus it is not repeated herein.

In the above described structure, when a shelter is located above the foot type and dermatoglyph recognition layer, a portion of the light-outputting surface of the identity recognition device is shielded by the shelter, and a reflecting interface is formed at the shielded portion. Light from the backlight source is reflected at the reflecting interface. The reflected light may transmit through an opening above the active regions of the first transistors T1 in some photosensitive units, thus, characteristics of the first transistors T1 vary depending on illumination variation at the active regions, and the sole outline information and the sole dermatoglyph information are obtained based on the varied characteristics.

For example, when not being shielded by any shelter, the first transistor T1 is maintained in an OFF-state with the function of the second bias voltage V2; when the active region of the first transistor T1 is shielded, the first transistor T1 generates a large leakage current flowing through the source electrode and the drain electrode. Before the second transistor T2 is turned on by a signal on the scanning line Sn, the leakage current generated due to photosensing is stored in the capacitor C1 in the case that a potential difference between the third bias voltage V3 and the first bias voltage V1 is large enough. After the second transistor T2 is turned on by the signal on the scanning line Sn, a photosensitive signal stored in the capacitor C1 is transmitted to the data line Dn via the second transistor T2. Here each photosensitive unit has such operating principle, the sole outline information and the sole dermatoglyph information can be obtained through analyzing the photosensitive signals output by the respective photosensitive units to the data lines.

Based on the same technical design, a manufacturing method is provided to manufacture any of the identity recognition devices described above. The manufacturing method includes following step S1 step S2 and step S3, which are not shown in the drawings.

In step S1, a pressure sensing detection layer is arranged at a light-outputting side or a non-light-outputting side of a display panel including a backlight source, where the pressure sensing detection layer is configured to acquire sole pressure information of a target user who is standing.

In step S2, a foot type and dermatoglyph recognition layer is arranged at the light-outputting side of the display panel, where the foot type and dermatoglyph recognition layer is configured to detect a light-shading condition of a light-outputting surface, and acquire sole outline information and sole dermatoglyph information of the target user standing with bare foot.

In step S3, a connection between an identity recognition module and the pressure sensing detection layer is formed and a connection between the identity recognition module and the foot type and dermatoglyph recognition layer is formed, where the identity recognition module is configured to recognize an identity of the target user according to the sole outline information, the sole dermatoglyph information and the sole pressure information.

For example, to manufacture the identity recognition device shown in FIG. 1 and FIG. 2, the foot type and dermatoglyph recognition layer is formed at the light-outputting side of the display panel and the pressure sensing detection layer is formed at the non-light-outputting side, and there is no restriction for the sequence of forming the foot type and dermatoglyph recognition layer and the pressure sensing detection layer. To manufacture the identity recognition device shown in FIG. 3 and FIG. 4, the pressure sensing detection layer may be first formed at the light-outputting side of the display panel and then the foot type and dermatoglyph recognition layer is formed on the pressure sensing detection layer. In addition, the connection between the identity recognition module and the pressure sensing detection layer and the connection between the identity recognition module and the foot type and dermatoglyph recognition layer may not be formed simultaneously, which is not limited herein.

It should be understood that, corresponding to the above identity recognition devices, the manufacturing method according to embodiments of the present disclosure may include steps for forming structures of the identity recognition devices, which are known to the skilled in the art and not repeated herein.

Figure 13:
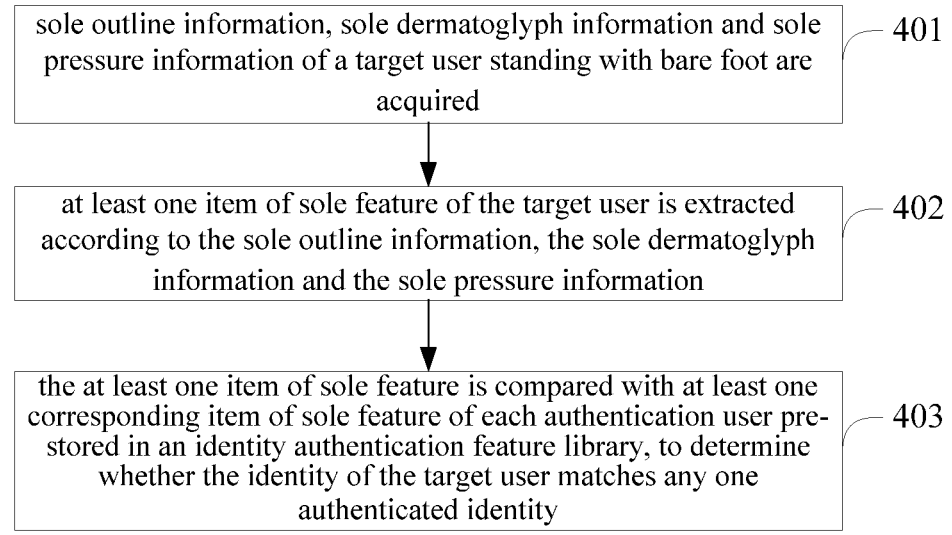
FIG. 13 is a schematic flow chart of an identity recognition method according to some embodiments of the present disclosure.

Based on the same technical design, an identity recognition method is provided according to some embodiments of the present disclosure. FIG. 13 is a schematic flow chart of the identity recognition method. As shown in FIG. 13, the method includes following step 401, step 402 and step 403.

In step 401, sole outline information, sole dermatoglyph information and sole pressure information of a target user standing with bare foot are acquired.

In step 402, at least one item of sole feature of the target user is extracted according to the sole outline information, the sole dermatoglyph information and the sole pressure information.

In step 403, the at least one item of sole feature is compared with at least one corresponding item of sole feature of each authentication user pre-stored in an identity authentication feature library, to determine whether the identity of the target user matches any one authenticated identity.

In case that multiple items of sole features are extracted, each item of the extracted sole features is compared with a corresponding sole feature of each authenticated user pre-stored in the identity authentication feature library, and it is determined that the identity of the target user matches an identity of an authenticated user when respective items of the extracted sole features are consistent with respective pre-stored items of sole features of the authenticated user.

It should be noted that, the at least one item of sole feature may include any one or more of sole features described above. It should be understood that, the operation procedure of any identity recognition module described above may be used to implement the identity recognition method in the embodiments of the present disclosure. By acquiring all of the sole outline information, the sole dermatoglyph information and the sole pressure information, various physiological features such as a sole bone structure, a skin appearance and a standing posture can be authenticated, thus a compact multimodal biometric recognition approach is achieved.

The identity recognition method, in addition to the steps shown in FIG. 13, may further include a following step that is not shown in FIG. 13: in a case that the identity of the target user does not match the identity of any authenticated user, sending a warning prompt, and acquiring sole outline information, sole dermatoglyph information and sole pressure information of the target user again. In a situation for which special requirements of security and protection are proposed, e.g., in an indoor situation where personal privacy needs to be protected from being revealed, identity recognition may be performed on a person entering the situation, and a warning prompt is sent when the person is determined as an unauthenticated person.

The identity recognition method, in addition to the steps shown in FIG. 13, may further include a following step that is not shown in FIG. 13: obtaining weight information of the target user based on the sole pressure information. Some physiological parameters can be obtained through the combination of the weight information, the sole outline information, the sole dermatoglyph information and the sole pressure information, such that health management for individual person or for family can be achieved.

The identity recognition method, in addition to the steps shown in FIG. 13, may further include a following step that is not shown in FIG. 13: adding the at least one item of sole feature and a newly generated user identification into the identity authentication feature library when it is determined that the identity of the target user does not match any authenticated identity. Therefore, the identity recognition method in the embodiments of the present disclosure may be applied to a target environment (for example, a natatorium) for identity recognition or identity authenticating so as to perform management conveniently.

Optionally, in any identity recognition method described above, the identity authentication feature library may be stored in a cloud server. Personal information data of all users can be stored in the cloud server which is safely protected, such that the personal information is effectively protected from being revealed. In addition, since all data are stored together, the user can use the data anytime and anywhere, and cloud service can be provided by means of computation based on big data.

It should be noted that, in the description of the present disclosure, terms "above", "below" and the like indicating an orientation or position relationship are based on an orientation or position relationship shown in the drawings, which is only intended to describe the present disclosure conveniently and simplify the description, but not for indicating or implying that the specific device or elements must be arranged in a particular orientation, or be constituted or operate in a particular orientation, and therefore shall not be understood as limiting the present disclosure. Unless otherwise expressly specified, terms "mounted", "coupled", and "connected" should be interpreted broadly, for example, which may be a fixed connection, a detachable connection, an integral connection, a mechanical connection, an electrical connection, a direct connection, an indirect connection via an intermediation, or a communication between the interior of two elements. Those skilled in the art can understand the specific meaning of the above terms depending on actual situations.

In the specification of the present disclosure, specific details are set forth. However, it will be understood that the embodiments may be practiced without these specific details. In some embodiments, well-known methods, structures and techniques have not been shown in detail in order not to obscure the understanding of the specification.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various aspects. However, the methods of the present disclosure are not to be interpreted as reflecting an intention that the claimed subject matter requires more features than are expressly recited in each claim. To be more precise, as reflected by the following claims, disclosed aspects may lie in less than all features of a single foregoing disclosed embodiment. Thus, the claims in accordance with the detailed description are hereby incorporated into the detailed description of the embodiments, with each claim standing on its own as a separate embodiment.

It should be noted that the above-mentioned embodiments illustrate rather than limit the present disclosure, and that those skilled in the art will be able to design alternative embodiments without departing from the scope of the appended claims. In the claims, any reference signs placed between parentheses shall not be constructed as limiting the claims. The word "comprising" does not exclude the presence of elements or steps not listed in a claim. The word "a" or "an" preceding an element does not exclude the presence of a plurality of such elements. The present disclosure can be implemented by means of hardware including several distinct elements, and by means of a suitably programmed compute. In a device claim enumerating several units, several of these units can be embodied by the same item of hardware. The words "first", "second" and "third" and the like used herein do not indicate any order, these words are to be interpreted as names.

It should be appreciated that, the above embodiments are only intended to illustrate the technical solution of the present disclosure, rather than limiting the present disclosure. Even through the present disclosure is explained in detail with reference to the foregoing embodiments, those skilled in the art may modify the technical solutions in forgoing embodiments and perform substitutions equivalently on a part or all of the technical features. With these modifications or substitutions, the spirit of the corresponding technical solutions does not depart from the scope of the technical solutions of the embodiments of the present disclosure, and these modifications or substitutions should be construed as falling within the scope of the present disclosure.

What is claimed is:

1. An identity recognition device, comprising:
a display panel comprising a backlight source;

a foot type and dermatoglyph recognition layer, that is located at a light-outputting side of the display panel and configured to detect a light-shielding condition of a light-outputting surface of the identity recognition device to acquire sole outline information and sole dermatoglyph information of a target user standing with bare foot;

a pressure sensing detection layer, that is located at a non-light-outputting side of the display panel or between the display panel and the foot type and dermatoglyph recognition layer and configured to acquire sole pressure information of the target user standing with bare foot; and an identity recognition circuit, configured to recognize an identity of the target user based on the sole outline information, the sole dermatoglyph information and the sole pressure information, wherein the foot type and dermatoglyph recognition layer comprises a plurality of rows of scanning lines and a plurality of columns of data lines, a plurality of photosensitive circuits is defined by intersections of the plurality of rows of scanning lines and the plurality of columns of data lines, and each of the plurality of photosensitive circuits comprises:

a capacitor having a first end connected to a first bias voltage;

a first transistor, wherein a gate electrode of the first transistor is connected to a second bias voltage, one of a source electrode and a drain electrode of the first transistor is connected to a third bias voltage, and the other of the source electrode and the drain electrode of the first transistor is connected to a second end of the capacitor, wherein a light from the light-outputting surface of the display panel is received by an active region of the first transistor; and a second transistor, wherein a gate electrode of the second transistor is connected to one of the plurality of rows of scanning lines, one of a source electrode and a source electrode of the second transistor is connected to the second end of the capacitor, and the other of the source electrode and the drain electrode of the second transistor is connected to one of the plurality of columns of data lines.

2. The identity recognition device according to claim 1, wherein the identity recognition circuit comprises:

a receiving circuit, connected to the foot type and dermatoglyph recognition layer and the pressure sensing detection layer and configured to receive the sole outline information, the sole dermatoglyph information and the sole pressure information;

an extracting circuit, connected to the receiving circuit and configured to extract at least one item of sole feature of the target user according to the sole outline information, the sole dermatoglyph information and the sole pressure information from the receiving circuit; and a comparing circuit, connected to the extracting circuit and configured to compare the at least one item of sole feature with at least one corresponding item of sole feature of each authenticated user pre-stored in an identity authentication feature library and determine whether the identity of the target user matches an identity of any authenticated user.

3. The identity recognition device according to claim 2, wherein the identity recognition circuit further comprises:

a warning circuit, connected to the comparing circuit and configured to send a warning prompt when the comparing circuit determines that the identity of the target user does not match the identity of any authenticated user.

4. The identity recognition device according to claim 2, wherein the identity recognition circuit further comprises:

an obtaining circuit, connected to the receiving circuit and configured to obtain weight information of the target user based on the sole pressure information from the receiving circuit.

5. The identity recognition device according to claim 2, wherein the identity recognition circuit further comprises:

an adding circuit, connected to the extracting circuit and the comparing circuit, and configured to add the at least one item of sole feature from the extracting circuit and a newly generated user identification into the identity authentication feature library when the comparing circuit determines that the identity of the target user does not match the identity of any authenticated user.

6. The identity recognition device according to claim 2, wherein the identity authentication feature library is stored in a cloud server.

7. The identity recognition device according to claim 2, further comprising a storage connected to the identity recognition circuit, wherein the identity authentication feature library is stored in the storage.

8. The identity recognition device according to claim 7, wherein the storage is further connected to the display panel such that contents stored in the storage are readable via the display panel and/or contents are writable into the storage via the display panel.

9. The identity recognition device according to claim 2, wherein the at least one item of sole feature comprises one or any combination of:

an outline pattern of a toe region;
a relative position relationship among centers of toes;
an outline pattern of a forefoot region;
an outline pattern of a heel region;
a position of a highly-pressed point of a heel relative to the sole; and
a pattern of sole dermatoglyphs.

10. The identity recognition device according to claim 1, wherein the pressure sensing detection layer comprises pressure sensing patterns formed at least two positions, and a material of the pressure sensing patterns comprises a piezoelectric material.

11. An identity recognition method, comprising:

acquiring sole outline information and sole dermatoglyph information of a target user standing with bare foot by a foot type and dermatoglyph recognition layer;

acquiring sole pressure information of a target user standing with bare foot;

extracting at least one item of sole feature of the target user according to the sole outline information, the sole dermatoglyph information and the sole pressure information; and comparing the at least one item of sole feature with at least one corresponding item of sole feature of each authentication user pre-stored in an identity authentication feature library, to determine whether an identity of the target user matches an identity of any authenticated user, wherein the foot type and dermatoglyph recognition layer comprises a plurality of rows of scanning lines and a plurality of columns of data lines, a plurality of photosensitive circuits is defined by intersections of the plurality of rows of scanning lines and the plurality of columns of data lines, and each of the plurality of photosensitive circuits comprises:

a capacitor having a first end connected to a first bias voltage;

a first transistor, wherein a gate electrode of the first transistor is connected to a second bias voltage, one of a source electrode and a drain electrode of the first transistor is connected to a third bias voltage, and the other of the source electrode and the drain electrode of the first transistor is connected to a second end of the capacitor, wherein a light from a light-outputting surface of a display panel is received by an active region of the first transistor; and a second transistor, wherein a gate electrode of the second transistor is connected to one of the plurality of rows of scanning lines, one of a source electrode and a source electrode of the second transistor is connected to the second end of the capacitor, and the other of the source electrode and the drain electrode of the second transistor is connected to one of the plurality of columns of data lines.

12. The identity recognition method according to claim 11, further comprising:

sending a warning prompt when it is determined that the identity of the target user does not match the identity of any authenticated user.

13. The identity recognition method according to claim 11, further comprising:

obtaining weight information of the target user based on the sole pressure information.

14. The identity recognition method according to claim 11, further comprising:

adding the at least one item of sole feature and a newly generated user identification into the identity authentication feature library when it is determined that the identity of the target user does not match the identity of any authenticated user.

15. The identity recognition method according to claim 11, wherein the identity authentication feature library is stored in a cloud server.

16. The identity recognition method according claim 11, wherein the at least one item of sole feature comprises one or any combination of:

an outline pattern of a toe region;

a relative position relationship among centers of toes;

an outline pattern of a forefoot region;

an outline pattern of a heel region;

a position of a highly-pressed point of a heel relative to the sole; and a pattern of sole dermatoglyphs.

17. A method for manufacturing an identity recognition device, comprising:

arranging a pressure sensing detection layer at a light-outputting side or a non-light-outputting side of a display panel comprising a backlight source, wherein the pressure sensing detection layer is configured to acquire sole pressure information of a target user standing with bare foot;

arranging a foot type and dermatoglyph recognition layer at the light-outputting side of the display panel, wherein the foot type and dermatoglyph recognition layer is configured to detect a light-shielding condition of a light-outputting surface, and acquire sole outline information and sole dermatoglyph information of the target user standing with bare foot; and forming a connection between an identity recognition circuit and the pressure sensing detection layer, and forming a connection between the identity recognition circuit and the foot type and dermatoglyph recognition layer, wherein the identity recognition circuit is configured to recognize an identity of the target user based on the sole outline information, the sole dermatoglyph information and the sole pressure information, wherein the foot type and dermatoglyph recognition layer comprises a plurality of rows of scanning lines and a plurality of columns of data lines, a plurality of photosensitive circuits is defined by intersections of the plurality of rows of scanning lines and the plurality of columns of data lines, and each of the plurality of photosensitive circuits comprises:

a capacitor having a first end connected to a first bias voltage;

a first transistor, wherein a gate electrode of the first transistor is connected to a second bias voltage, one of a source electrode and a drain electrode of the first transistor is connected to a third bias voltage, and the other of the source electrode and the drain electrode of the first transistor is connected to a second end of the capacitor, wherein a light from the light-outputting surface of the display panel is received by an active region of the first transistor; and a second transistor, wherein a gate electrode of the second transistor is connected to one of the plurality of rows of scanning lines, one of a source electrode and a source electrode of the second transistor is connected to the second end of the capacitor, and the other of the source electrode and the drain electrode of the second transistor is connected to one of the plurality of columns of data lines.

* * * * *